May 30, 1933.     S. V. E. TAYLOR     1,912,323
HYDRAULIC GEAR
Filed Nov. 21, 1931     3 Sheets-Sheet 1

Inventor
Scott V. E. Taylor

By Geo. P. Kimmel
Attorney

May 30, 1933.  S. V. E. TAYLOR  1,912,323
HYDRAULIC GEAR
Filed Nov. 21, 1931   3 Sheets-Sheet 3

Inventor
Scott V. E. Taylor
By Geo. P. Kimmel
Attorney

UNITED STATES PATENT OFFICE

SCOTT V. E. TAYLOR, OF AKRON, OHIO

HYDRAULIC GEAR

Application filed November 21, 1931. Serial No. 576,556.

This invention relates to a hydraulic gear and has for its object to provide a gear of such class, in a manner as hereinafter set forth whereby an infinite variation of speed of a driven element can be obtained with the driving means therefor rotating at a constant high speed and with the torque transmitted to the driven element increasing as its speed decreases.

If a vessel is wholly or partially filled with liquid and made to rotate, the contained liquid acquires the same angular velocity as its container causing it to exert a hydrostatic pressure against the walls of the vessel equal to the square of the velocity of the liquid at the point in question times the specific gravity of the liquid times the proper conversion factor divided by $2g$. Therefore if a spiral shaped pipe is placed in the liquid, there will be a total head on the liquid flowing into the pipe equal to the sum of the hydrostatic pressure head above mentioned and the velocity head due to the velocity of the liquid relative to the pipe, or this total head will be equal to $$\frac{v^2}{2g} + \frac{(v-v_o)^2}{2g}$$

multiplied by the proper constant. The symbol $v$ in the above expression represents the average absolute velocity of the liquid over the cross sectional area of the pipe, the symbol $v_o$ = the average absolute velocity of the pipe taken over the cross sectional area of the opening of the pipe, and the symbol $g$ is the constant used to convert weight units into mass units. The remaining constant is dependent upon the specific gravity of the liquid and the system of units of measurement used.

Also if there is placed a vane in the rapidly moving fluid, the liquid will exert a force on the vane equal to the total hydrostatic pressure of the liquid against it, normal to the axis taken from the vane, plus the product of the mass of liquid that flows over the vane in one second of time and the difference in velocities at entrance and exit of liquid relative to the same axis as above mentioned and $(1-\cos a)$ where $a$ is the total angle through which the liquid rotates before leaving the vane. If $\cos a$ is made equal to zero, the total force of the liquid against the vane will evidently be a maximum for any given combination of speeds of the liquid and of the vane for the construction hereinafter described. Such a condition prevails in the following construction as the liquid enters tangentially and exits radially relative to the rotating vane ring driven.

Although the general operation of this hydraulic gear is similar to the ones mentioned in my previous Patents 1,757,850 and 1,831,690, that is, a vane wheel driven by the fluid impelled into it by an outer concentric fluid containing vessel which rotates at high speed, it includes an additional provision to prevent slippage or loss of velocity in the liquid before entering the vanes. The gear in accordance with this invention also has an additional advantage over the previous constructions in that the reaction between the driving and driven gears aids in transmitting the power from the driver to driven parts of this mechanism.

Further objects of this invention are to provide, in a manner as hereinafter set forth, a gear of the class referred to, which is comparatively simple in its construction and arrangement, strong, durable, compact, thoroughly efficient in its use, readily assembled and installed with respect to a driven means therefor, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to, which fall within the scope of the claims hereunto appended.

In the drawings wherein like reference characters denote corresponding parts throughout the several views.

Figure 1:
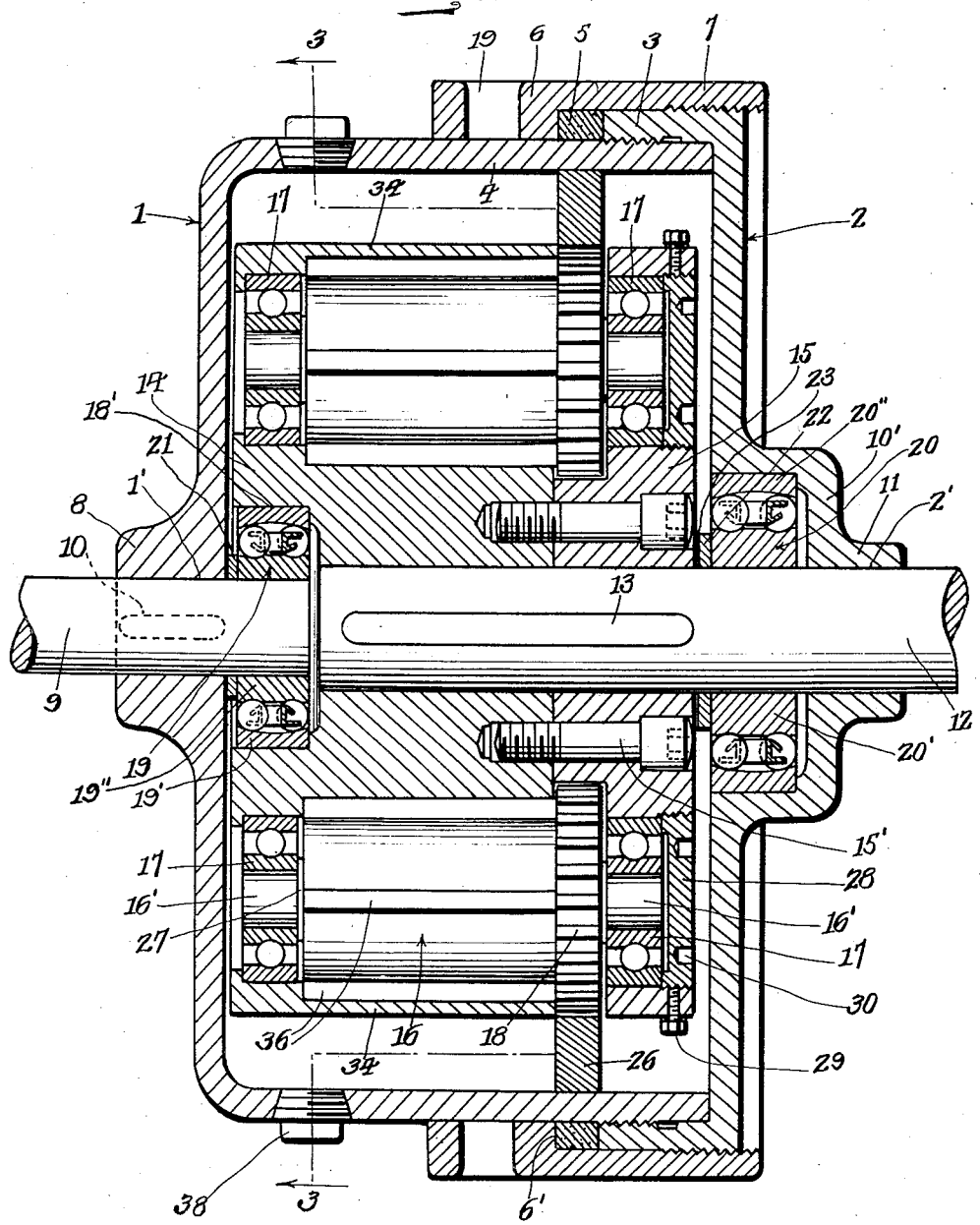
Figure 1 is a vertical sectional view of the gear.
Figure 2:
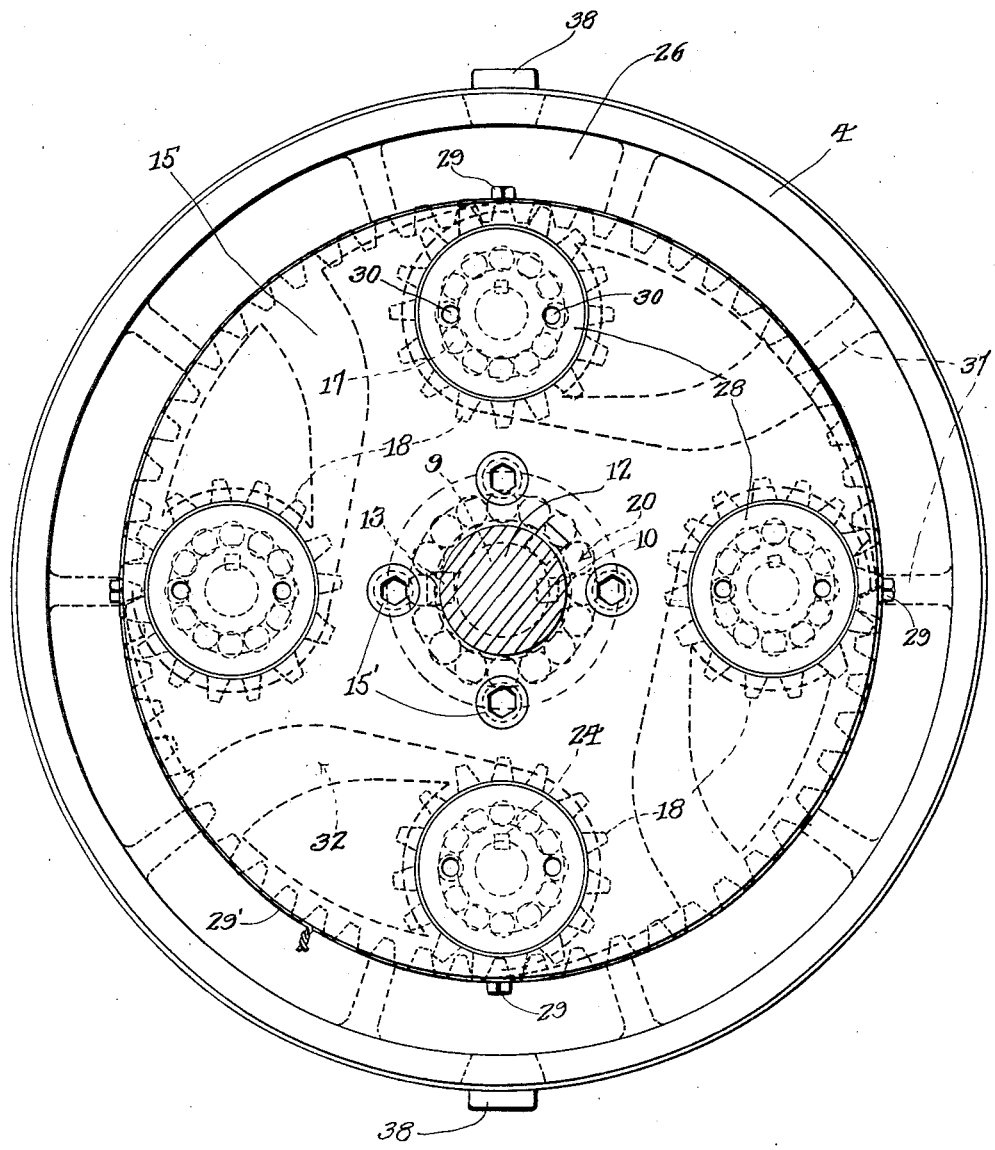
Figure 2 is a side elevation thereof with cover and seal ring removed.
Figure 3:
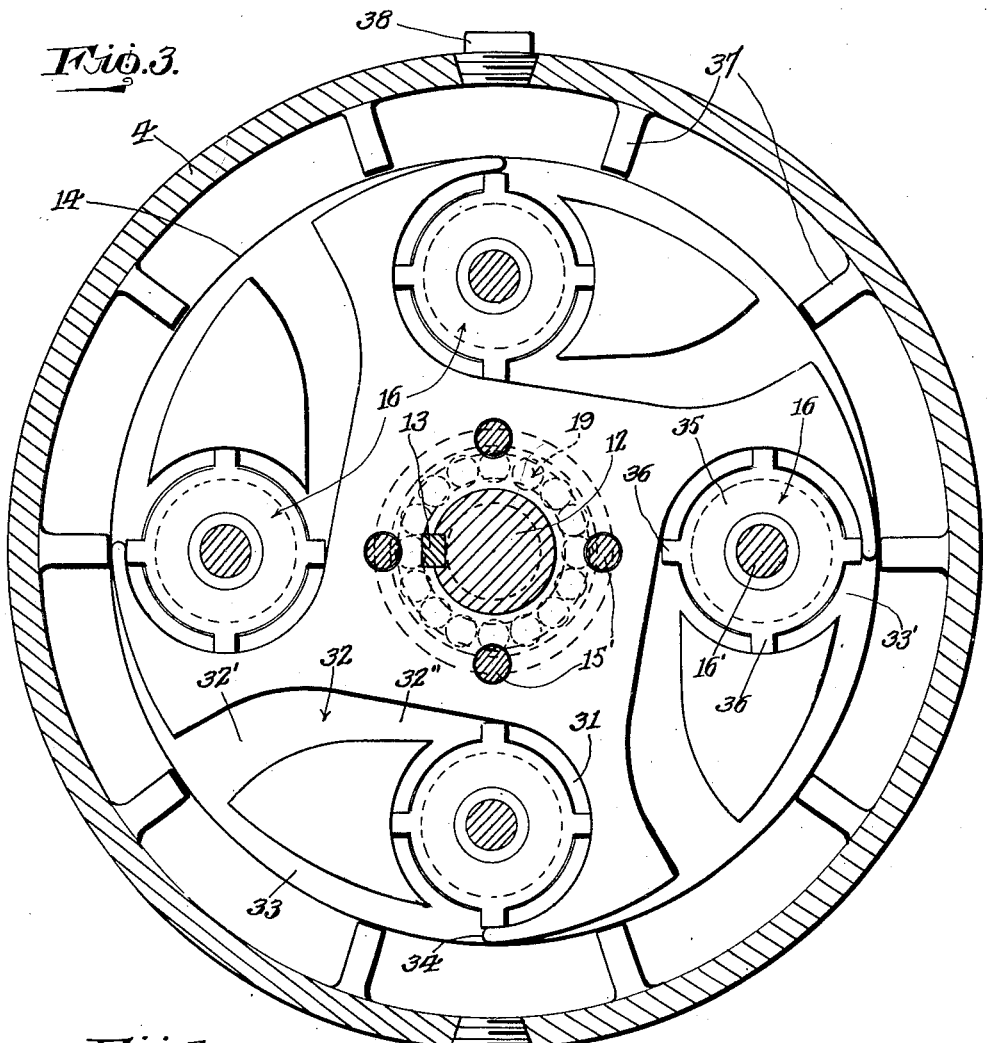
Figure 3 is a section on line 3—3 Figure 1.
Figure 4:
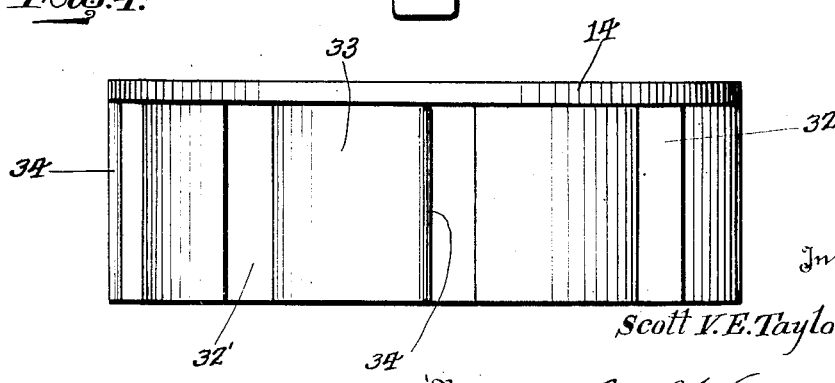
Figure 4 is a top plan of the rotor.

Referring to the drawings in detail, the numerals 1 and 2 respectively indicate the front and rear threadedly connected cup-shaped sections of a substantially drum shaped housing, the section 2 having an annular wall 3 overlapping and threadedly connected with an annular wall 4 of the section 1. The wall 4 is of greater cross sectional length than wall 3. Each section has an axial opening. The openings are indicated at 1', 2'. The connection between the sections is rendered fluid tight by means of a packing ring 5 encompassing wall 4 adjacent to the threads connecting the sections and a sealing ring 6. This packing ring 5 is arranged against the edge of wall 3 and is compressed by means of ring 6 which is concentric to and surrounds both sections 1 and 2 and packing ring 5 and which is threadedly connected to section 2 by means of threaded annular wall 7. This ring is rotated by means of a spanner wrench inserted into the holes 19, normally projects from section 2 and is formed with an internal shoulder 6' bearing against ring 5.

Centrally thereof, the section 1 is formed with an outwardly projecting boss 8 which is centrally apertured to align with the wall of opening 1'. Extending through the latter and boss 8 is a drive shaft 9. The boss 8 is preferably pressed on the shaft 9 and is further keyed thereto by means of a key 10 which extends longitudinally of the shaft 9. The section 2 is formed centrally thereof with an offset hub 10' formed with an outwardly projecting boss 11 provided with a centrally disposed opening registering with opening 2'. Rotatably mounted with respect to the section 2, and extended through the boss 11 and opening 2' is a driven shaft 12.

Disposed within the housing is a rotor consisting of two parts, one a rotor body 14 and the other a rotor cap 15 held together by socket head cap screws 15' and located in the proper alignment with one another by key 13. Within the rotor there is arranged a plurality of equally spaced bladed wheels 16 having their shafts 16' mounted in anti-friction bearing assemblies 17 within body 14 and cap 15 and driven by gears 18 which are pressed and keyed onto shafts 16' by means of key 24. The driven shaft 12 extends through the hub 10' and is keyed to the rotor assembly by means of the key 13 extending longitudinally of the shaft 12. The end of rotor body 14 adjoining boss or hub 8 is recessed, as at 18' to receive a bearing assembly 19 which is held in spaced relation from housing 1 by washer 21 abutting the side face of bearing assembly 19. The outer race 19' of the bearing assembly 19 is fixedly secured with respect to rotor body 14 and the inner race 19" of this assembly is slidably mounted on an inner end portion of the drive shaft 9. Arranged within the hub 10' is a bearing assembly 20 whose inner race 20' is slidably mounted on driven shaft 12 and whose outer race 20" is fixedly secured to and within the hub 10' of section 2 of the drum. Spaced between the exposed face of rotor cap 15 and the exposed face of bearing assembly 20 is a washer 22 and shims 23, and the latter in connection with washer 21 maintains the rotor assembly in the proper relation to both bearing assemblies 19 and 20.

The wheels 16 and gears 18 which are keyed to the shafts of the wheels 16 are driven by internal ring gear 26 which is pressed into the bore of the wall 4 of drum shaped section 1. The side faces of bearing assemblies 17 abut against shoulders 27 on the bladed wheel shafts. The outer race of bearing assembly 17 in the rotor body 14 is fixedly secured with respect to the latter and its inner race slidably mounted on one end of the shafts of the bladed wheels 16. The outer race of each bearing assembly 17 in the rotor cap is slidably mounted in the cap and its inner race fixedly mounted on the outer end of a bladed wheel shaft. These latter bearing assemblies are suitably adjusted by means of take up rings 28 which are threaded into the rotor body cap. These rings are locked in place by set screws 29 and are provided with holes 30 into which a suitable wrench may be inserted for turning them. Locking means indicated at 29' and in the form of a wire is extended through the screws 29 and the ends twisted to prevent the turning of the latter is employed.

Rotor body cap 15 is recessed around gears 18 to give them clearance to turn freely and also is grooved for the reception of gear 26.

Rotor body 14 is provided at equally spaced intervals with chambers or recesses 31 in which are arranged the bladed wheels 16 and which open into tapered exhaust channels 32 of curved shape, the rearward sides 32' of which are substantially radial with respect to the axis of rotation of driven shaft 12 and the forward sides 32', 32" which are disposed tangentially to recesses 31. The entrance of the fluid to the bladed wheels 16 is along successive tangentially disposed grooves 33 formed circumferentially in the edge of the rotor body and each of which gradually increases in depth toward an intake 33' for a chamber 31. The bottom, at leading or forward ends of these grooves merge open into the circular chambers or recesses 31 around the bladed wheels 16 by means of semi-circular portions, of preferably small radii which are tangent to the outer periphery of the rotor body and from the intakes 33'. At the forward or leading end of each intake a lip 34 is arranged.

Each wheel 16 consists of a circular body 35 formed with projecting blades 36 of rectangular or any other convenient shape longitudinally disposed. Thus the path of the fluid from lips 34 through 180° of arc is circular and uniform in cross section, but from that point on the passage gradually widens so that the velocity of the liquid drops while its pressure increases as it proceeds along the tapered section of the groove thus increasing the amount of fluid that can be forced through the passages with the minimum of effort by the driving mechanism.

Formed on the inner face of the front section 1 are a plurality of spaced blades 37 which extend inward radially towards the rotor. Each blade 37 is shown of rectangular shape in cross section though it may be made of any other convenient shape. Gear 26 rests against the inner edges of these blades and may if need be driven from them by suitable projections secured to it.

Plugs 38 are provided in housing 1 for filling and draining the gear. The recesses or chambers 31 in connection with the channels 32 provide fluid passages through the rotor.

The velocities of the tips of the rotatable bladed wheels will be less than, equal to or greater than the velocities imparted to the fluid by the housing depending upon the proportions of ring gear, pinion gears and outside diameter of the tips of the bladed wheels. The inventor believes that the proportions of these three latter mentioned parts in gear shown are such that the velocity of the tips of the rotatable bladed wheel will be equal to the velocity imparted to the liquid by the housing. For the velocity relationship to be such that the blade tip velocity is equal to the fluid velocity it is necessary that the pitch diameter of the pinion gears (the bladed wheel gears) be the same as the outside diameter of the bladed wheel. For the blade tip velocity to be greater than the velocity of the liquid, the pitch diameter of the pinion gears must be less than the O. D. of the bladed wheels, this proportioning is such that the speed in R. P. M. of the bladed wheels is greater, consequently the O. D. of the bladed wheels and the size of the housing remaining the same the speed of the tips of the bladed wheels must be greater. Vice-versa for the blade tip velocity to be less than the fluid velocity, the pinion gear pitch diameter must be greater than the O. D. of the bladed wheel.

The term "gear ratio" is to mean the ratio between the ring gear and the gears on the bladed wheels. The reaction between the ring gear and the pinion gear is one of the force transmitting the drive between the housing and the rotor. This force will tend to be substantially constant at all differences in speed between the driving and driven members, due to the fact that the head that the bladed wheels are acting against is always constant.

If the speeds of the driving shaft and the driven shaft ever become the same, however, this gear reaction will become zero as there then will be no relative motion between the ring gear and the pinion gears. This condition may infer that the drive was unstable in character however, it should be taken into consideration that the hydrostatic pressure against the exposed vertical faces of the rotor facing the direction of rotation is still acting on the rotor causing it to maintain its rotation.

As to the actual operation of the gear, it is filled with enough liquid before assembly so that the liquid when thrown outward against the inside periphery of the housing will extend toward the center of the housing sufficiently far to insure that all the passages of the rotor will be filled with liquid.

Starting from rest with the housing rotating counter clockwise the liquid will at first rest in the lower half of the housing, as it speeds up all of the liquid will fly radially outward against the inside walls of the housing and the thickness of the sheet of liquid will be such that it extends inward to completely fill all the passages in the rotor. The bladed rotor wheels 16 carrying gears 18 which are driven by this ring gear 26 attached to the housing pick up the liquid adjacent to these passages and also the liquid carried against them by blades 37 attached to the housing and shoot it radially outward through the tapered exhaust passages 32 in the rotor.

Due to the widening of these passages toward their exits the velocity of the exhaust fluid decreases as its pressure increases according to the Bernoulli theorem. As the liquid leaves radially at high pressure, it acts like a piston against the lower pressure but higher speed liquid moving past the exit of passages 32 displacing some of the high speed fluid ahead inward toward the entrances of the passages in the rotor causing the high speed fluid to impact directly on the desired spots of the rotor. The fluid continues the cycle just described until the housing reaches full speed, the pressure of the exhaust fluid building up during this time until it reaches equilibrium at the full speed of the speed providing the rotor is rotating at constant speed.

It is evident that the greater the difference in speeds between the rotor and the housing, the greater will be the force exerted against the rotor by the high speed liquid acting as above described. In other words, the force exerted on the housing by the fluid impact will be greatest when the rotor is stationary and least when the rotor is running at its full speed.

Besides the force due to the impact of the liquid on the rotor, there are three other forces acting on it; first, a constant force tending to cause the rotor to rotate, the gear reaction between the rotor pinion gears and the ring gear which is carried by the housing; second, a force constant after the rotor reaches full speed, the hydrostatic pressure of the liquid against the exposed vertical faces of the rotor adjacent to the passage entrances; and third, a force which is always variable dependent upon the variation in speeds between the rotor and the housing, the force due to the skin friction of the water carried by the housing against the rotor surfaces exposed to the high speed water.

If both housing and rotor speeds become equal, forces due to fluid impact, skin friction, and gear reaction will be zero but the force due to hydrostatic pressure will not be zero. Moreover it is axiomatic that this latter force be great enough in magnitude to overcome or balance the resistance to the rotation of the rotor at the time when the rotor and housing speeds are equal. However, if the resistance on the driven shaft to which the rotor is connected rises, the other three forces will then come into action to overcome the increased resistance, thus providing one with an automatically flexible transmission whose speed varies inversely as the resistance against it.

Not only will this construction rotate the driven shaft forward, but it can be used as a brake on the rotation of the driven due to the fact that the driving and driven members are geared together the thrust reaction between the gears will cause the driven member to drive the driving high speed member when its motivating energy has been shut off providing the low speed driven has an excess of energy available.

It is though that the many advantages of a hydraulic gear in accordance with this invention will be readily apparent, and although the preferred embodiment of this invention is as illustrated and described, it is to be understood that changes in the size, shape and arrangement of parts may be resorted to, so long as such changes fall within the scope of the invention as defined in the appended claims.

What I claim is: —

1. In a fluid transmission for transmitting power from a drive to a driven shaft, a fluid containing housing mounted for rotation with the drive shaft, a rotor within the housing and being mounted for rotation with the driven shaft, said rotor having its edge formed with circumferentially extending successive grooves, each gradually increasing in depth from its follower end to its leading end, said rotor being formed therein with fluid passages, each having a substantially tangentially disposed intake opening into the leading end of a groove and an outlet opening into the groove intermediate the ends of the latter, a bladed wheel in each passage, said wheel and housing having coacting means for driving the wheel, and inwardly extending ribs on said housing.

2. In a fluid transmission for transmitting power from a drive to a driven shaft, a fluid containing housing mounted for rotation with the drive shaft, a rotor within the housing and being mounted for rotation with the driven shaft, said rotor having its edge formed with circumferentially extending successive grooves, each gradually increasing in depth from its follower end to its leading end, said rotor being formed therein with fluid passages, each having a substantially tangentially disposed intake opening into the leading end of a groove and an outlet opening into the groove intermediate the ends of the latter, a bladed wheel in each passage, said wheel and housing having coacting means for driving the wheel, inwardly extending ribs on said housing, and each of said passages gradually increasing in width towards its outlet.

3. In a fluid transmission for transmitting power from a drive to a driven shaft, a fluid containing housing mounted for rotation with the drive shaft, a rotor within the housing and being mounted for rotation with the driven shaft, said rotor having its edge formed with circumferentially extending successive grooves, each gradually increasing in depth from its follower end to its leading end, said rotor being formed therein with fluid passages, each having a substantially tangentially disposed intake opening into the leading end of a groove and an outlet opening into the groove intermediate the ends of the latter, a bladed wheel in each passage, said wheel and housing having coacting means for driving the wheel, inwardly extending ribs on said housing, and each of said passages gradually increasing in width towards its outlet and formed with an enlarged circular forward part encompassing in spaced relation the wheel mounted in the passage.

4. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, the rear portions of said passages gradually increasing in width toward their outlets, bladed wheels carried by bearings in the rotor, each wheel being surrounded by the forward portion of a passage and carrying on its shaft a gear, an internal gear attached to the housing, common to and driving said gears, said housing being provided with longitudinally disposed internal ribs.

5. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, the rear portions of said passages gradually increasing in width toward their outlets, rotatable bladed wheels carried by bearings in the rotor, each wheel being surrounded by the forward portion of a passage and carrying on its shaft a gear and an internal gear attached to the housing, common to and driving said gears.

6. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, rotatable bladed wheels carried by bearings in the rotor, each wheel being surrounded by the forward portion of each passage carrying on its shaft a gear, and an internal gear attached to the housing, common to and driving said gears, said housing being provided with longitudinally disposed internal ribs.

7. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, rotatable bladed wheels carried by bearings in the rotor, each wheel being surrounded by the forward portion of a passage and carrying on its shaft a spur gear, and an internal gear attached to the housing for operating said gears.

8. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, the rear portions of said passages gradually increasing in width toward their outlets, rotatable bladed wheels carried by bearings in the rotor and each surrounded by the forward portion of a passage and carrying on its shaft a spur gear, and an internal gear attached to the housing for driving said gears, the gear ratio being such that the velocity of the central part of the tips of the rotatable bladed wheel is equal to that imparted to the fluid by the housing at the longitudinal center line of the inlet to the passage in the rotor, and said housing being provided with longitudinally disposed internal ribs.

9. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, the rear portions of said passages gradually increasing in width toward their outlets, rotatable bladed wheels carried by bearings in the rotor and each surrounded by the forward portion of a passage and carrying on its shaft a spur gear, an internal gear attached to the housing for driving said gears, the gear ratio being such that the velocity of the central part of the tips of the rotatable bladed wheel is greater than that imparted to the fluid by the housing at the longitudinal center line of the inlet to the passage in the rotor, and said housing being provided with longitudinally disposed internal ribs.

10. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances the rear portions of said passages gradually increasing in width toward their outlets, rotatable bladed wheels carried by bearings in the rotor and each surrounded by the forward portion of a passage and carrying on its shaft a spur gear, an internal gear attached to the housing for driving said gears, the gear ratio being such that the velocity of the central part of the tips of the rotatable bladed wheel is less than that imparted to the fluid by the housing at the longitudinal center line of the inlet to the passage in the rotor, and said housing being provided with longitudinally disposed internal ribs.

11. In a fluid transmission for transmitting power from a drive shaft to a driven shaft, a fluid container housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, rotatable bladed wheels carried by bearings in the rotor and each surrounded by the forward portion of a passage and carrying on its shaft a spur gear, an internal gear attached to the housing, common to and driving said spur gears, the gear ratio being such that the velocity of the central part of the tips of the rotatable bladed wheel is equal to that imparted to the fluid by the housing at the longitudinal center line of the inlet to the passage in the rotor, and said housing being provided with longitudinally disposed internal ribs.

12. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed intermediate the entrances, rotatable bladed wheels carried by bearings in the rotor and each surrounded by the forward portion of a passage and carrying on its shaft a spur gear, an internal gear attached to the housing, common to and driving said spur gears, the gear ratio being such that the velocity of the central part of the tips of the rotatable bladed wheel is greater than that imparted to the fluid by the housing at the longitudinal center line of the inlet to the passage in the rotor, and said housing being provided with longitudinally disposed internal ribs.

13. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a series of fluid passages having their entrances disposed tangentially of the rotor and further having their outlets disposed intermediate the entrances, rotatable bladed wheels carried by bearings in the rotor and each surrounded by the forward portion of a passage and carrying on its shaft a spur gear, an internal gear attached to the housing for driving said spur gears, the gear ratio being such that the velocity of the central part of the tips of the rotatable bladed wheel is less than that imparted to the fluid by the housing at the longitudinal center line of the inlet to the passage in the rotor, and said housing being provided with longitudinally disposed internal ribs.

14. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a series of fluid passages having their entrances disposed tangentially of the rotor and further having their outlets disposed radially of the rotor, forward portion of each of said rotor passages being around a rotatable bladed wheel carried by bearings in the rotor and carrying on its shaft a spur gear which is driven by an internal gear attached to the housing, the gear ratio being such that the velocity of the central part of the tips of the rotatable bladed wheel is equal to that imparted to the fluid by the housing at the longitudinal center line of the inlet to the passage in the rotor.

15. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed radially of the rotor, rotatable bladed wheels carried by bearings in the rotor, each surrounded by the forward portion of a passage and carrying on its shaft a gear, an internal gear attached to the housing, common to and driving said gears, the gear ratio being such that the velocity of the central part of the tips of the rotatable bladed wheel is greater than that imparted to the fluid by the housing at the longitudinal center line of the inlet to the passage in the rotor.

16. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor and further having their outlets disposed radially of the rotor, rotatable bladed wheels carried by bearings in the rotor and each surrounded by the forward portion of a passage and carrying on its shaft a spur gear, an internal gear attached to the housing, common to and operating said spur gears, the gear ratio being such that the velocity of the central part of the tips of the rotatable bladed wheel is less than that imparted to the fluid by the housing at the longitudinal center line of the inlet to the passage in the rotor.

17. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor, rotatable bladed wheels carried by bearings in the rotor, each being surrounded by the forward portion of a passage and carrying on its shaft a spur gear, an internal gear attached to the housing for simultaneously driving said spur gears, the gear ratio being such that the velocity of the central part of the tips of the rotatable bladed wheel is equal to that imparted to the fluid by the housing at the longitudinal center line of the inlet to the passage in the rotor.

18. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor, rotatable bladed wheels carried by bearings in the rotor and each being surrounded by the forward portion of a passage and carrying on its shaft a spur gear, an internal gear attached to the housing for driving said spur gears, the gear ratio being such that the velocity of the central part of the tips of the rotatable bladed wheel is greater than that imparted to the fluid by the housing at the longitudinal center line of the inlet to the passage in the rotor.

19. In a fluid transmission for transmitting power from a drive shaft to a driven shaft, a fluid containing housing mounted for rotation with the drive shaft, a rotor within the housing, said rotor being mounted for rotation with the driven shaft, said rotor being provided with a plurality of fluid passages having their entrances disposed substantially tangentially of the rotor, rotatable bladed wheels carried by bearings in the rotor and each being surrounded by the forward portion of a passage and carrying on its shaft a spur gear, an internal gear attached to the housing for driving the spur gears, the gear ratio being such that the velocity of the central part of the tips of the rotatable bladed wheel is less than that imparted to the fluid by the housing at the longitudinal center line of the inlet to the passage in the rotor.

In testimony whereof, I affix my signature hereto.

SCOTT V. E. TAYLOR.